(12) United States Patent
Naslund et al.

(10) Patent No.: US 11,686,742 B2
(45) Date of Patent: Jun. 27, 2023

(54) LASER AIRSPEED MEASUREMENT SENSOR INCORPORATING REVERSION CAPABILITY

(71) Applicant: Rosemount Aerospace Inc., Burnsville, MN (US)

(72) Inventors: Brian Brent Naslund, Chanhassen, MN (US); Andrew Sherman, Farmington, MN (US); Benjamin John Langemo, Shakopee, MN (US); Matthew Paul Anderson, Lakeville, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 304 days.

(21) Appl. No.: 16/953,838

(22) Filed: Nov. 20, 2020

(65) Prior Publication Data

US 2022/0163556 A1 May 26, 2022

(51) Int. Cl.
*G01P 5/26* (2006.01)

(52) U.S. Cl.
CPC ..................................... *G01P 5/26* (2013.01)

(58) Field of Classification Search
None
See application file for complete search history.

(56) References Cited

U.S. PATENT DOCUMENTS

| | | |
|---|---|---|
| 3,921,173 A | 11/1975 | Thomson |
| 4,913,519 A | 4/1990 | Klainer et al. |
| 5,028,929 A | 7/1991 | Sand et al. |
| 5,202,692 A | 4/1993 | Huguenin et al. |
| 5,214,438 A | 5/1993 | Brusgard et al. |
| 5,243,185 A | 9/1993 | Blackwood |
| 5,285,256 A | 2/1994 | Nelson et al. |
| 5,307,077 A | 4/1994 | Branigan et al. |

(Continued)

FOREIGN PATENT DOCUMENTS

| | | | |
|---|---|---|---|
| CA | 2048991 C | 12/1998 | |
| CA | 2982114 A1 * | 6/2018 | ............. B64D 43/02 |

(Continued)

OTHER PUBLICATIONS

Joseph Nemarich et al., "Backscatter and Attenuation by Falling Snow and Rain at 96, 140, and 225 GHz", IEEE Transactions of Geosceince and Remote Sensing, Vo., 26, No. 3, May 1988.

(Continued)

*Primary Examiner* — Luke D Ratcliffe
(74) *Attorney, Agent, or Firm* — Kinney & Lange, P. A.

(57) ABSTRACT

An air data system includes a laser emitter, a laser receiver, and an electronics module. The electronics module includes a processor and computer-readable memory encoded with instructions that, when executed by the processor, cause the laser to emit a coherent light pulse into a target volume locating within an exhaust flow aft of an aircraft. The laser receiver detects backscatter produced by the coherent light pulse interacting with the aft target volume, and the electronics module determines an air data parameter based on the backscatter and at least one of an engine parameter indicative of an engine condition of the aircraft and an aircraft parameter indicative of a state of the aircraft before outputting the air data parameter to a consuming system of the aircraft.

18 Claims, 6 Drawing Sheets

(56) References Cited

U.S. PATENT DOCUMENTS

| | | |
|---|---|---|
| 5,327,149 A | 7/1994 | Kuffer |
| 5,488,375 A | 1/1996 | Michie |
| 5,500,530 A | 3/1996 | Gregoris |
| 5,546,183 A * | 8/1996 | Fegley ............... G01N 15/0205 |
| | | 356/336 |
| 5,621,410 A | 4/1997 | Gray et al. |
| 5,748,091 A | 5/1998 | Kim |
| 5,973,649 A | 10/1999 | Andressen |
| 6,069,565 A | 5/2000 | Stern et al. |
| 6,091,335 A | 7/2000 | Breda et al. |
| 6,166,699 A | 12/2000 | Khammouni et al. |
| 6,225,955 B1 | 5/2001 | Chang et al. |
| 6,295,034 B1 | 9/2001 | Brown et al. |
| 6,377,202 B1 | 4/2002 | Kropfli et al. |
| 6,377,205 B1 | 4/2002 | Eckersten et al. |
| 6,377,207 B1 | 4/2002 | Solheim et al. |
| 6,425,286 B1 | 7/2002 | Anderson et al. |
| 6,430,996 B1 | 8/2002 | Anderson et al. |
| 6,606,066 B1 | 8/2003 | Fawcett et al. |
| 6,777,684 B1 | 8/2004 | Volkov et al. |
| 6,819,265 B2 | 11/2004 | Jamieson et al. |
| 7,283,791 B2 | 10/2007 | Nilsson et al. |
| 7,370,525 B1 | 5/2008 | Zhao et al. |
| 7,379,166 B2 | 5/2008 | Meneely et al. |
| 7,400,260 B2 | 7/2008 | Levine |
| 7,986,408 B2 | 7/2011 | Ray et al. |
| 8,022,842 B2 | 9/2011 | Levine |
| 8,144,325 B2 | 3/2012 | Ray et al. |
| 8,320,424 B2 | 11/2012 | Bolt et al. |
| 8,338,785 B2 | 12/2012 | Ray |
| 8,451,435 B2 | 5/2013 | Schlotterbeck et al. |
| 8,527,233 B2 | 9/2013 | McIntyre |
| 8,604,963 B1 | 12/2013 | Kronfeld et al. |
| 8,620,495 B2 | 12/2013 | Alwin et al. |
| 8,654,427 B1 | 2/2014 | DeAngelo |
| 8,761,970 B2 | 6/2014 | McIntyre et al. |
| 9,041,926 B2 | 5/2015 | Ray et al. |
| 9,096,323 B1 | 8/2015 | Ray et al. |
| 9,116,243 B1 | 8/2015 | Brown |
| 9,188,700 B2 | 11/2015 | Bunch et al. |
| 9,222,873 B2 | 12/2015 | Baumgardner et al. |
| 9,244,166 B1 | 1/2016 | Finley et al. |
| 9,295,245 B1 | 3/2016 | Guice et al. |
| 9,304,081 B2 | 4/2016 | Renno |
| 9,588,220 B2 | 3/2017 | Rondeau et al. |
| 9,924,138 B1 | 3/2018 | Brown |
| 9,932,127 B2 | 4/2018 | Anderson et al. |
| 10,006,928 B1 | 6/2018 | Hagerott et al. |
| 10,147,244 B2 | 12/2018 | Atalla et al. |
| 10,320,141 B2 | 6/2019 | Miller et al. |
| 10,429,511 B2 | 10/2019 | Bosetti et al. |
| 10,444,367 B2 | 10/2019 | Lodden et al. |
| 10,723,479 B2 | 7/2020 | Anderson et al. |
| 10,725,173 B2 | 7/2020 | Ray et al. |
| 10,775,504 B2 | 9/2020 | Garde et al. |
| 10,816,661 B2 | 10/2020 | Ray et al. |
| 2004/0036630 A1 | 2/2004 | Jamieson et al. |
| 2007/0247612 A1 | 10/2007 | Pack et al. |
| 2008/0137058 A1 | 6/2008 | Cesare |
| 2008/0251733 A1 | 10/2008 | Anderton |
| 2009/0027651 A1 | 1/2009 | Pack et al. |
| 2009/0222150 A1 | 9/2009 | Preaux |
| 2010/0110431 A1 | 5/2010 | Ray et al. |
| 2010/0328143 A1 | 12/2010 | Kirk |
| 2010/0332056 A1 | 12/2010 | Kirk |
| 2011/0219869 A1 * | 9/2011 | Asahara ................ G01S 17/95 |
| | | 73/181 |
| 2012/0274938 A1 | 11/2012 | Ray |
| 2013/0103316 A1 | 4/2013 | Ray et al. |
| 2013/0162974 A1 | 6/2013 | Dakin et al. |
| 2014/0180503 A1 | 6/2014 | Colliau et al. |
| 2015/0233962 A1 | 8/2015 | Tchoryk et al. |
| 2015/0330310 A1 * | 11/2015 | deGaribody ........... G01S 17/58 |
| | | 702/45 |
| 2016/0356890 A1 | 12/2016 | Fried et al. |
| 2017/0276790 A1 | 9/2017 | Lodden et al. |
| 2017/0356997 A1 | 12/2017 | Ray et al. |
| 2018/0024270 A1 | 1/2018 | Ray et al. |
| 2018/0088239 A1 * | 3/2018 | Garde ....................... G01P 5/26 |
| 2018/0172720 A1 | 6/2018 | Miller et al. |
| 2019/0094256 A1 * | 3/2019 | Naslund ................... G01P 5/26 |
| 2019/0146090 A1 | 5/2019 | Sly et al. |
| 2019/0170863 A1 | 6/2019 | Sly et al. |
| 2019/0217966 A1 | 7/2019 | Winter |
| 2020/0183015 A1 | 6/2020 | Garde |

FOREIGN PATENT DOCUMENTS

| | | |
|---|---|---|
| CN | 109039449 A | 12/2018 |
| DE | 102006032387 A1 | 1/2008 |
| DE | 102014105366 A1 | 10/2015 |
| EP | 1428046 B1 | 4/2006 |
| EP | 1936386 A2 | 6/2008 |
| EP | 2184232 A2 | 5/2010 |
| EP | 2434296 A2 | 3/2012 |
| EP | 2518529 A2 | 10/2012 |
| EP | 3301456 A1 | 4/2018 |
| EP | 3663773 A1 | 6/2020 |
| FR | 3093567 A1 | 9/2020 |
| GB | 2559885 A | 8/2018 |
| JP | 2000075029 A | 3/2000 |
| WO | WO0111582 A1 | 2/2001 |
| WO | WO03050778 A1 | 6/2003 |
| WO | WO2014181014 A1 | 11/2014 |
| WO | WO2015179905 A1 | 12/2015 |

OTHER PUBLICATIONS

James B. Mead et al., "Remote Sensing of Clouds and For with a 1.4-mm Radar", Journal of Atmospheric and Oceanic Technology, vol. 6, pp. 1090-1097, 1989.

Robin J. Hogan and Anthony J. Illingworth, "The Potential of Spaceborne Dual-Wavelength Radar to Make Global Measurements of Cirrus Clouds", J. Atmos Oceanic Tech, 1999, 16, 518-531.

V. Vasic, D. G. Feist, S. Muller and N. Kampfer, "An airborne radiometer for stratospheric water vapor measurements at 183 GHz," in IEEE Transactions on Geoscience and Remote Sensing, vol. 43, No. 7, pp. 1563-1570, Jul. 2005. (Year: 2005.

Luke et al., "Detection of supercooled liquid in mixed-phase clouds using radar Doppler spectra", Journal of Geophysical Research, vol. 115, No. D19, Oct. 16, 2010.

S.L. Durden et al., "A Cloud and Precipitation Radar System Concept for the ACE Mission", 2011 California Institute of Technology.

Cooper et al., "A Grating-Based Circular Polarization Duplexer for Submillimeter-Wave Transceivers", IEEE Microwave and Wireless Components Letters, vol. 22, No. 3, Mar. 2012.

Leal-Sevillano et al., "A 225 GHz Circular Polarization Waveguide Duplexer Based on a Septum Orthomode Transducer Polarizer", IEEE Transactions of Terahertz Science and Technology, vol. 3, No. 5, Sep. 2013.

A. Battaglia et al., "G Band Atmospheric Radars: New Frontiers in Cloud Physics", Atmos. Meas. Tech., 7, 1527-1546, 2014.

Extended European Search Report for EP Application No. 17171547. 7, dated Nov. 8, 2017, pp. 9.

Extended European Search Report for EP Application No. 17171553. 5, dated Nov. 7, 2017, pp. 8.

Extended European Search Report for EP Application No. 17207656. 4, dated Mar. 2, 2018, pp. 8.

Lin C. C. et al: "Macsim: a cloud profiling radar for studying the Earth radiation processes and budget", Radar '97. Edinburgh, Oct. 14-16, 2019; [IEE Comference Publication], London: IEE GB, vol. No. 449, Oct. 14, 1997 (Oct. 14, 1997), pp. 361-365, XP006508968, DOI: 10.1049/CP:19971696 ISBN: 978-0-85296-698-3 *paragraph [001]-[0004], [05.2]*.

Brandon Redding et al. "Using a mutimode fiber as a high resolution, low loss spectrometer," Department of Applied Physics, Yale University, New Haven, CT, 06520, pp. 3.

(56) References Cited

OTHER PUBLICATIONS

Extended European Search Report for EP Application No. 21209595.4, dated Apr. 8, 2022, pp. 11.
Extended European Search Report for EP Application No. 21209679.6, dated Apr. 11, 2022, pp. 9.
First Brazilian Office Action for BR Application No. BR1020170088189, dated May 26, 2022, pp. 6.
First Brazilian Office Action for BR Application No. BR1020170088200, dated May 26, 2022, pp. 6.
First Canadian Office Action for CA Application No. 2961046, dated Oct. 24, 2022, pp. 3.
First Canadian Office Action for CA Application No. 2961050, dated Oct. 27, 2022, pp. 8.

* cited by examiner

LASER AIRSPEED MEASUREMENT SENSOR INCORPORATING REVERSION CAPABILITY

BACKGROUND

The present invention relates to laser air data systems and, in particular, to redundant laser air data systems for providing dissimilar, reliable air data systems for aircraft.

Modern aircraft incorporate air data systems that calculate air data outputs based on measured parameters collected from various sensors positioned about the aircraft. For instance, many air data systems utilize air data probes that measure pneumatic pressure of oncoming airflow about the aircraft exterior to generate aircraft air data outputs, such as angle of attack (i.e., an angle between the oncoming airflow or relative wind and a reference line of the aircraft, such as a chord of a wing of the aircraft), angle of sideslip (i.e., a nonzero angle between the direction of travel of the aircraft and the aircraft centerline extending through the nose of the aircraft), calibrated airspeed, Mach number, altitude, or other air data parameters.

An increasing desire to mitigate risks of common failure modes has led to the incorporation of dissimilar air data system components, for example, laser-based air data systems. Current laser-based air data systems involve one of two types of detection, molecular-detection, and aerosol-detection. Molecular-detection systems utilize laser energy to interact with gas molecules and interpret absorption and reflection properties of the sampled air while aerosol-detection systems utilize laser energy to interact with aerosols and interpret intensities and time-delays of reflected returns. Both laser system types use Doppler shift to determine relative velocity of airflow along the axis of the laser beam. Inconsistent distribution of gas molecules and aerosols pose a limitation to laser-based air data systems that require high availability.

SUMMARY

An air data system and method in accordance with an exemplary embodiment of the present invention includes a laser emitter, a laser receiver, and an electronics module. The electronics module includes a processor and computer-readable memory encoded with instructions that, when executed by the processor, cause the laser to emit a coherent light pulse into a target volume aft of and within an engine exhaust flow of the aircraft. After the laser receiver detects backscatter light returns produced by the coherent light pulses interacting with the aft target volume, the electronics module determines an air data parameter based on the backscatter light return and at least one of an engine parameter indicative of a condition of an aircraft engine and an aircraft parameter indicative of a state of the aircraft. Further, the electronics module outputs the air data parameter to a consuming system of the aircraft.

In a further exemplary air data system and method of the present invention, the electronics module causes the laser emitter, or a different laser emitter, to emit another coherent light pulse into a forward target volume. Backscatter light returns produced by the interaction of the coherent light pulse and the forward target volume are received by the laser receiver. If the intensity of the backscatter from the forward target volume is greater than a light intensity threshold, the electronics module determines an air data parameter based on the backscatter from the forward target volume. If the light intensity from the forward target volume is less than the light intensity threshold, the electronics module causes a coherent light pulse to be emitted into the aft target volume. Thereafter, the electronics module determines and outputs an air data parameter to a consuming system of the aircraft based on the backscatter from the aft target volume and at least one of the engine parameter and the aircraft parameter.

DETAILED DESCRIPTION

As described herein, an example air data system includes a laser air data probe for determining at least one parameter output for an air data system. Coherent light pulses emitted from a laser emitter target an exhaust air flow rich with water, soot, and other aerosol particulates aft of the aircraft. An electronics module incorporated into the laser air data probe housing, a SmartProbe® air data system housing, an air data computer, or other air data system component calculates an air data parameter based on the light returns backscattered by the coherent light pulse interacting with the aft target volume and at least one of an engine parameter and an aircraft parameter. Engine parameters include parameters proportional to an amount of particulate within an engine exhaust stream. For example, the air data parameter can be determined based on one or more of an engine power setting, a rotational speed of a fan, or a rotational speed of a compressor of the aircraft engine. Aircraft parameters are indicative of a flight condition of the aircraft. For example, aircraft parameters can include one or more of a position of an aircraft control surface (e.g., horizontal or vertical stabilizer, ailerons, or flaps), an angle of attack of the aircraft (i.e., an angle between the oncoming airflow or relative wind and a reference line of the aircraft, such as a chord of a wing of the aircraft), and an angle of sideslip (i.e., a nonzero angle between the direction of travel of the aircraft and the aircraft centerline extending through the nose of the aircraft). Accordingly, the air data system can provide at least one air data parameter based on laser backscatter from an engine exhaust volume containing a reliable aerosol source while compensating for variances in aerosol concentration due to engine operation, aircraft orientation, or both engine operation and aircraft orientation.

Figure 1A:
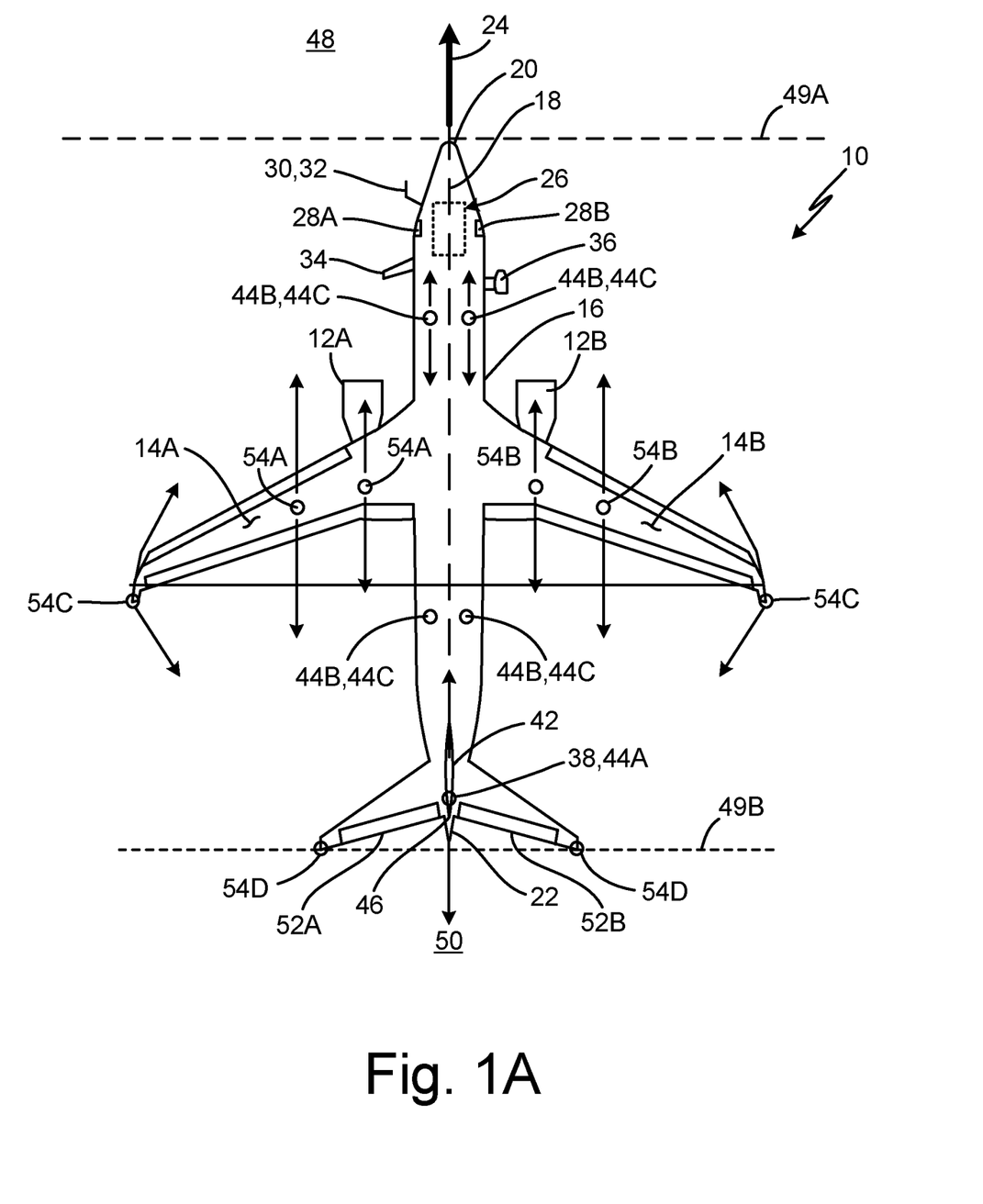
FIG. 1A and FIG. 1B are schematic views showing mounting locations for a laser air data probe on an aircraft.
Figure 1B:
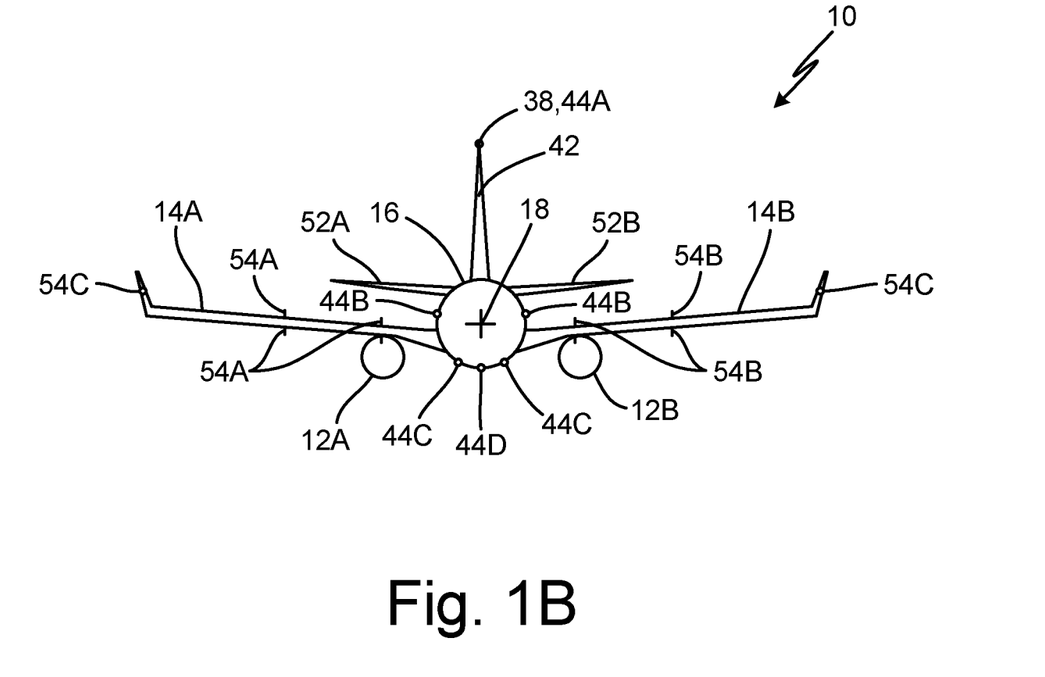

FIG. 1A is a plan view and FIG. 1B is an elevation view, each showing a schematic representation of aircraft 10. As shown, aircraft 10 is a typical fixed-wing aircraft propelled by engines 12A and 12B mounted to the underside of respective wings 14A and 14B. Fuselage 16, to which each wing 14A, 14B is attached, extends along longitudinal centerline 18 from forward end (or nose) 20 to aft end (or tail) 22. In operation, engines 12A and 12B propel aircraft 10 along the ground or through the air as indicated by arrow 24, each engine 12A and 12B producing an exhaust flow aft of wings 14A, 14B and aft end 22.

While aircraft 10 is depicted as a fixed-wing aircraft with dual engines, other aircraft types and engine configurations are also within the scope of the disclosure. For instance, aircraft 10 can be any aircraft with an exhaust flow including a helicopter, other rotary-wing aircraft, and fixed-wing aircraft other than the configuration shown in FIGS. 1A and 1B. Furthermore, this disclosure includes other engine configurations, including fewer or more than two engines, engines mounted on an aircraft fuselage, engines mounted on the upper side of wings, and any other engine configurations.

Aircraft 10 includes air data system 26 that calculates air data outputs based on measured parameters collected from various sensors positioned about the aircraft. For instance, air data system 26 can include air data probes that measure pneumatic pressure of oncoming airflow about the aircraft exterior to generate air data outputs, such as angle of attack (i.e., an angle between the oncoming airflow or relative wind and a reference line of aircraft 10, such as a chord of wing 14A, 14B of aircraft 10), angle of sideslip (i.e., an angle between the direction of travel of the aircraft and longitudinal centerline 18 extending through nose forward end 20 of aircraft 10) calibrated airspeed, Mach number, altitude, or other air data parameters. Air data probes relying on pneumatic measurements or aerodynamic interaction with the oncoming airstream include static pressure probes 28A and 28B, pitot pressure probe 30, multi-function probe 32, angle of attack sensor 34, total air temperature probe 36, which may be mounted on the same or opposite sides of aircraft 10 as is known in the art.

Additionally, air data system 26 can include one or more laser air data probes 38 that calculate air data parameters based on backscatter intensity, frequency, and/or time delay and corrected based on one or more engine parameters and/or one or more aircraft parameters. Because laser air data probes 38 calculate air data based on backscatter rather than pneumatic measurements or aerodynamic interaction with the oncoming airflow, air data calculated using data derived from laser air data probe 38 increases dissimilarity of air data system 26 since laser air data probes 38 do not include pneumatic sensing ports, which can become clocked, blocked, or damaged.

FIGS. 1A and 1B depict various potential mounting locations for laser air data probe 38. Suitable locations for laser air data probe 38 have clear line of sight from the mounting location to a volume targeted for measurement. Some mounting locations provide clear line of sight to multiple target volumes. For example, certain mounting locations provide clear line of sight to a target volume forward of aircraft 10 and another target volume aft of aircraft 10. As shown in FIGS. 1A and 1B, laser air data probe 38 attaches to vertical stabilizer 42 at mounting location 44A, which is shown at the uppermost portion of vertical stabilizer 42 but could be mounted at any location along vertical stabilizer 42 that does not interfere with rudder 46 at the trailing edge thereof. From mounting location 44A, laser air data probe 38 has clear line of sight to forward target volume 48 and clear line of sight to aft target volume 50. Forward target volume 48 is located forward of wings 14A and 14B and forward of nose 20 as indicated by dashed line 49A while aft target volume 50 is located aft of tail 22 as indicated by dashed line 49B. Similarly, mounting locations 44B are located along the upper half of fuselage 16 between wings 14A and 14B and horizontal stabilizers 52, and mounting locations 44C are located along the lower half of fuselage 16 below wings 14A, 14B including along the bottommost portion of fuselage 16 as indicated by location 44D. Each of locations 44B, 44C, and 44D have clear line of sight to forward target volume 48 and aft target volume 50.

Alternative locations for laser air data probe 38 include along the upper surface and lower surface of wings 14A, 14B as indicated by mounting locations 54A and 54B, respectively. Similarly, mounting locations 54C can be found at tips of wings 14A, 14B, and mounting locations 54D can be at tips of horizontal stabilizers 52. However, in each of mounting locations 54A, 54B, 54C, and 54D can have a clear line of sight to one of forward target volume 48 or aft target volume 50.

Figure 2:
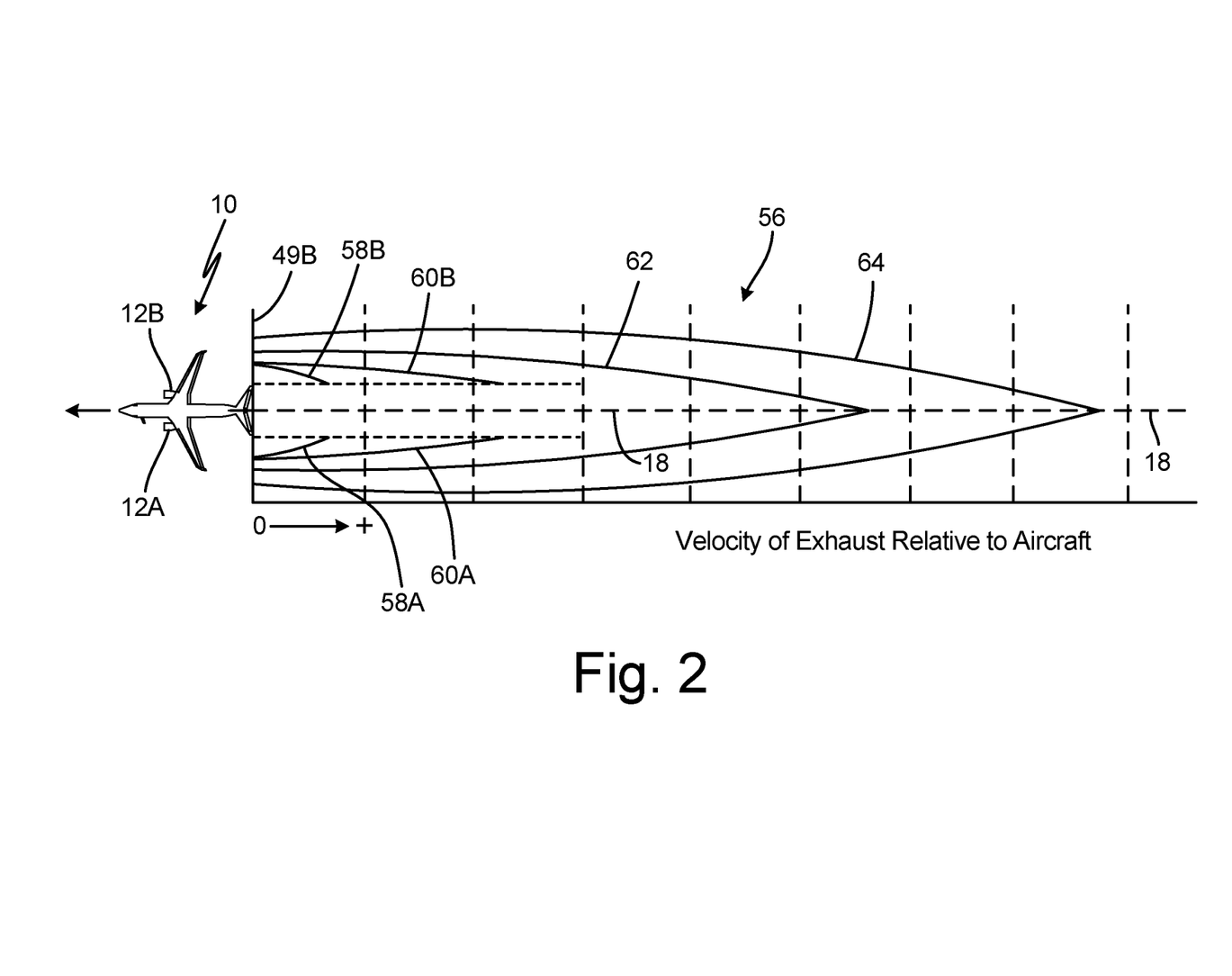
FIG. 2 is a graphic depicting a velocity distribution for an exemplary exhaust flow relative to an aircraft velocity.

FIG. 2 is a graphic depicting a velocity distribution of exhaust flow 56 discharged from engines 12A and 12B relative to forward flight of aircraft 10. As shown, the velocity distribution of exhaust flow 56 is characterized by high velocity regions 58A and 58B immediately aft from respective engines 12A, 12B followed by medium-high velocity regions 60A and 60B further aft therefrom. Medium-high velocity regions 60A and 60B merge into medium low velocity region 62, which is followed by low velocity region 64 as the profile moves further raft from aircraft 10.

While FIG. 2 depicts an exemplary velocity distribution of exhaust flow 56, FIG. 2 is also representative of regions aft from aircraft 10 containing high concentrations of combustion products (i.e., water, soot, etc.) in high velocity regions 58A, 58B immediately aft from engines 12A, 12B progressing to low concentrations of combustion products in low velocity region 62 as exhaust flow 56 diffuses into the air stream aft of aircraft 10.

Figure 3A:
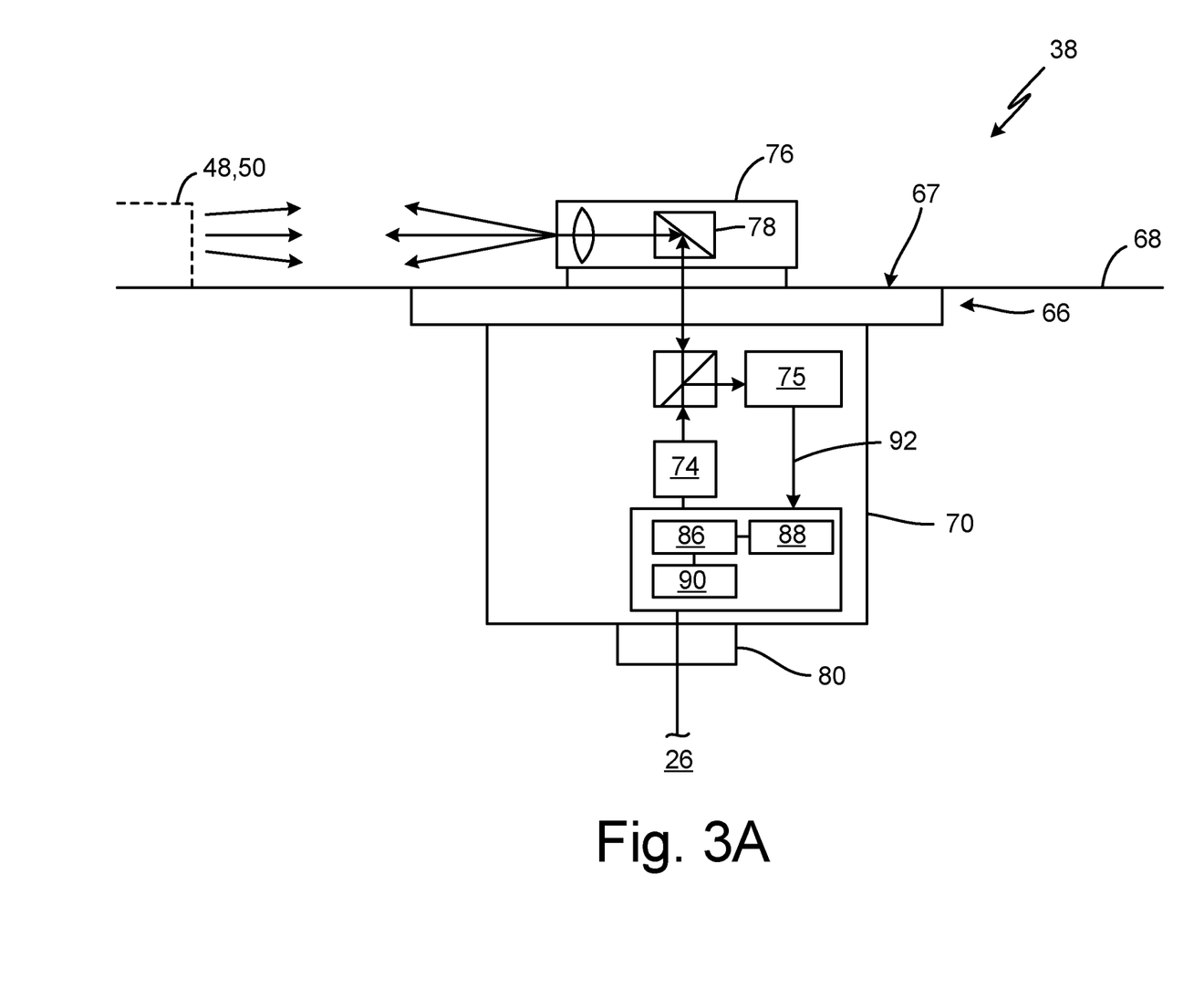
FIG. 3A is a schematic view of a laser air data probe implementing a fixed orientation laser emitter.

Aft target volume 50 can be located within any region of exhaust flow 56 with clear line of sight to one of mounting locations 44A, 44B, 44C, 44D, 54A, 54B, 54C, and 54D equipped with laser air data probe 38. The specific location of aft target volume 50 within exhaust flow 56 depends on a variety of factors. For instance, as the power of coherent light pulse emitted by laser air data probe 38 increases, aft target volume 50 can be located further aft of airplane 10 since the light intensity of backscatter increases with laser power for a given aerosol density. Other factors affect the aerosol density with aft target volume 50. For example, the aerosol density within exhaust flow 56 can be increased or decreased commensurate with engine power setting. Additionally, local wind conditions about the aircraft, the orientation of the aircraft, and aircraft maneuvers can bias exhaust flow 56 laterally, vertically, or both laterally and vertically relative to longitudinal centerline 18. Generally, these environmental and aircraft affects increase as the location of aft target volume 50 is further aft from aircraft 10. Suitable locations for aft target volume 50 will have consistent aerosol density for a variety of local wind conditions and aircraft maneuvers paired with laser air data probe 38 with sufficient power to produce air data parameters with acceptable signal-to-error ratio. While the best locations of aft target volume 50 will vary with aircraft and engine selections, placing aft target volume 50 along longitudinal axis 18 generally satisfy these criteria.

FIGS. 3A, 3B, 3C, and 3D are schematic representations of laser air data probe 38, each utilizing a different directional device for redirecting coherent light pulses towards a target volume. FIG. 3A is a schematic representation of laser air data probe 38 utilizing a laser emitter with a fixed orientation for emitting coherent light pulses. Laser air data probe 38 includes mounting plate 66 to facilitate installation of laser air data probe 38 to outer skin 68 of aircraft 10 via fasteners or other suitable mechanical attachment means. Exterior surface 67 of mounting plate 66 aligns with and conforms to outer skin 68 of aircraft 10. Extending inward towards an interior of aircraft 10 is housing 70. Housing 70 encloses internal components of laser air data probe 38 such as electronics module 72, laser emitter 74, and laser receiver 75. Enclosure 76 extends from a side of mounting plate 66 opposite housing 70 towards a space exterior to aircraft 10 and encloses mirror 78 for redirecting coherent light pulses from laser emitter 74 towards forward target volume 48 or aft target volume 50. In certain installations of laser air data probe 38, laser emitter 74 and laser receiver 75 may have direct line of sight to forward target volume 48 or aft target volume 50 through enclosure 76, and mirror 78 or another directional device can be omitted. Enclosure 76 can include aerodynamically shaped external surfaces to reduce disruption of airflow about aircraft 10. Electrical interface connector 80 protrudes from an interior end of housing 70 and exchanges data, including backscatter intensity data and/or air data parameters for use by air data system 26.

Figure 3B:
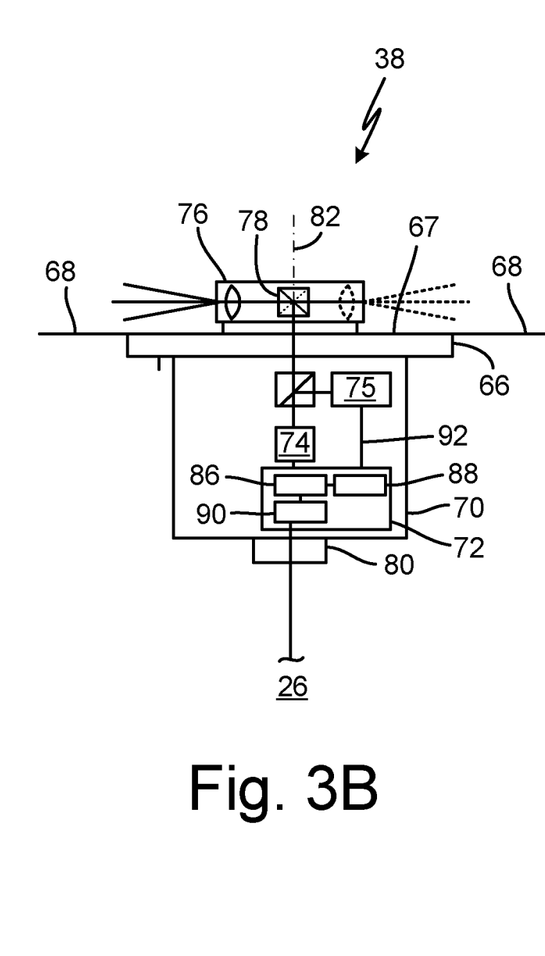
FIG. 3B is a schematic view of a laser air data probe equipped with a positional or variable orientation laser emitter.
Figure 3C:
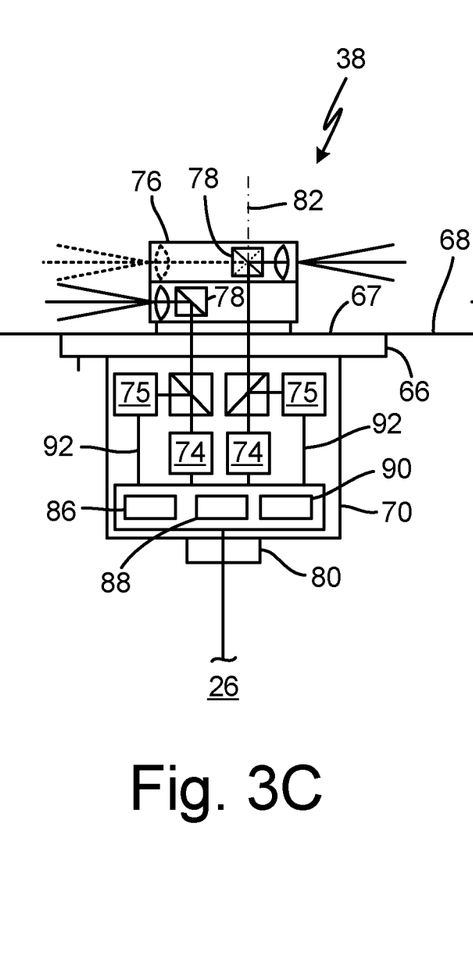
FIG. 3C is a schematic view of a laser air data probe that includes a combination of fixed orientation and variable orientation laser emitters.
Figure 3D:
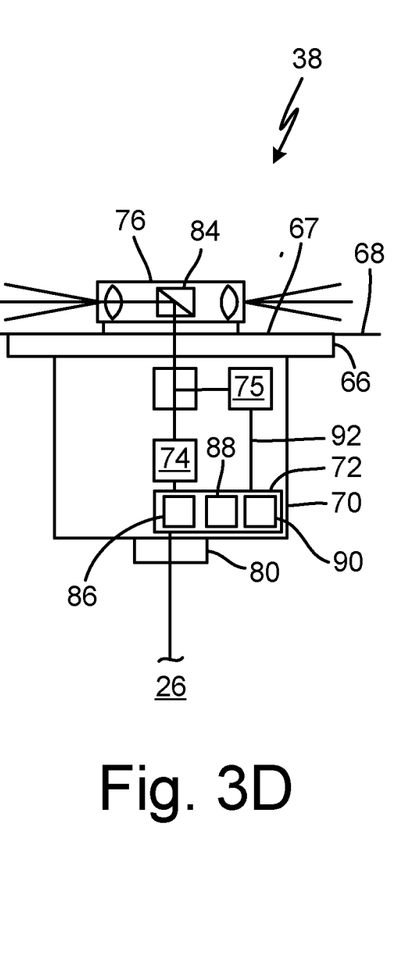
FIG. 3D is a schematic view of a laser air data probe with a laser beam splitter with multiple emission orientations.

FIG. 3B depicts another exemplary embodiment of laser air data probe 38. However, instead of providing a fixed emission direction, laser air data probe 38 can include a positional or variable emission direction by mounting mirror 78 to be rotatable about axis 82. While varying the emission direction of laser air data probe 38 allows the target volume location to vary as a function of mirror angle, such embodiments of laser air data probe 38 can only direct coherent light pulses into a single target volume at a time. Similarly, laser air data probe 38 can include multiple laser emitters 74 and receivers 76 as shown in FIG. 3C, each of which can be configured to have a variable emission direction or fixed emission direction. However, if laser beam splitter 84 is used in place of mirror 78, coherent light pulses transmitted from laser emitter 74 can be split into a first coherent light pulse directed toward forward target volume 48 and a second light pulse directed toward aft target volume 50 as depicted by FIG. 3D. In each of the embodiments depicted by FIGS. 3B, 3C, 3D, components common with the FIG. 3A embodiment operate in the same manner previously described.

In any of the embodiments described above, electronics module 72 can be mounted within housing 70. Alternatively, electronics module 72 can be operatively associated with another component of the air data system, or aircraft consuming system, in which electronics module 72 may be mounted remotely from laser air data probe 38. For instance, electronics module 72 can be mounted and incorporated into multi-function probe 32, an air data computer, or other component of air data system 26. Wherever located, electronics module 72 includes at least the components discussed below, but may also include additional components necessary or desired for implementation into those components. In reference to FIGS. 3A, 3B, 3C, and 3D, electronics module 72 includes processor 86, computer-readable memory 88, and communication device 90 and receives signal 92 from laser receiver 75. Signal 92 may be an analog or digital signal indicative of backscatter intensity, time delay, or frequency.

Examples of processor 86 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 88 can be configured to store information within electronics module 72 during operation. Computer-readable memory 88, in some examples, is described as a computer-readable storage medium. In certain examples, a computer-readable storage medium can include a non-transitory medium. The term "non-transitory" can indicate that the storage medium is not embodied in a carrier wave or a propagated signal. In some examples, a non-transitory storage medium can store data that can, over time, change (e.g., in RAM or cache). Computer-readable memory 88 can include volatile memory, non-volatile memory, or both. Examples of volatile memories can include random access memories (RAM), dynamic random access memories (DRAM), static random access memories (SRAM), and other forms of volatile memories. Examples of non-volatile memories can include flash memories, forms of electrically programmable memories (EPROM) or electrically erasable and programmable (EEPROM) memories, magnetic hard discs, optical discs, floppy discs, or other forms of non-volatile memories.

Communication device 90 can be network interface cards (or other interface devices) configured to send and receive data over a communications network and/or data bus according to one or more communications protocols, such as the ARINC 429 communication protocol, CAN bus communication protocol, MIL-STD-1553 communication protocol, or other communication protocol.

Figure 4:
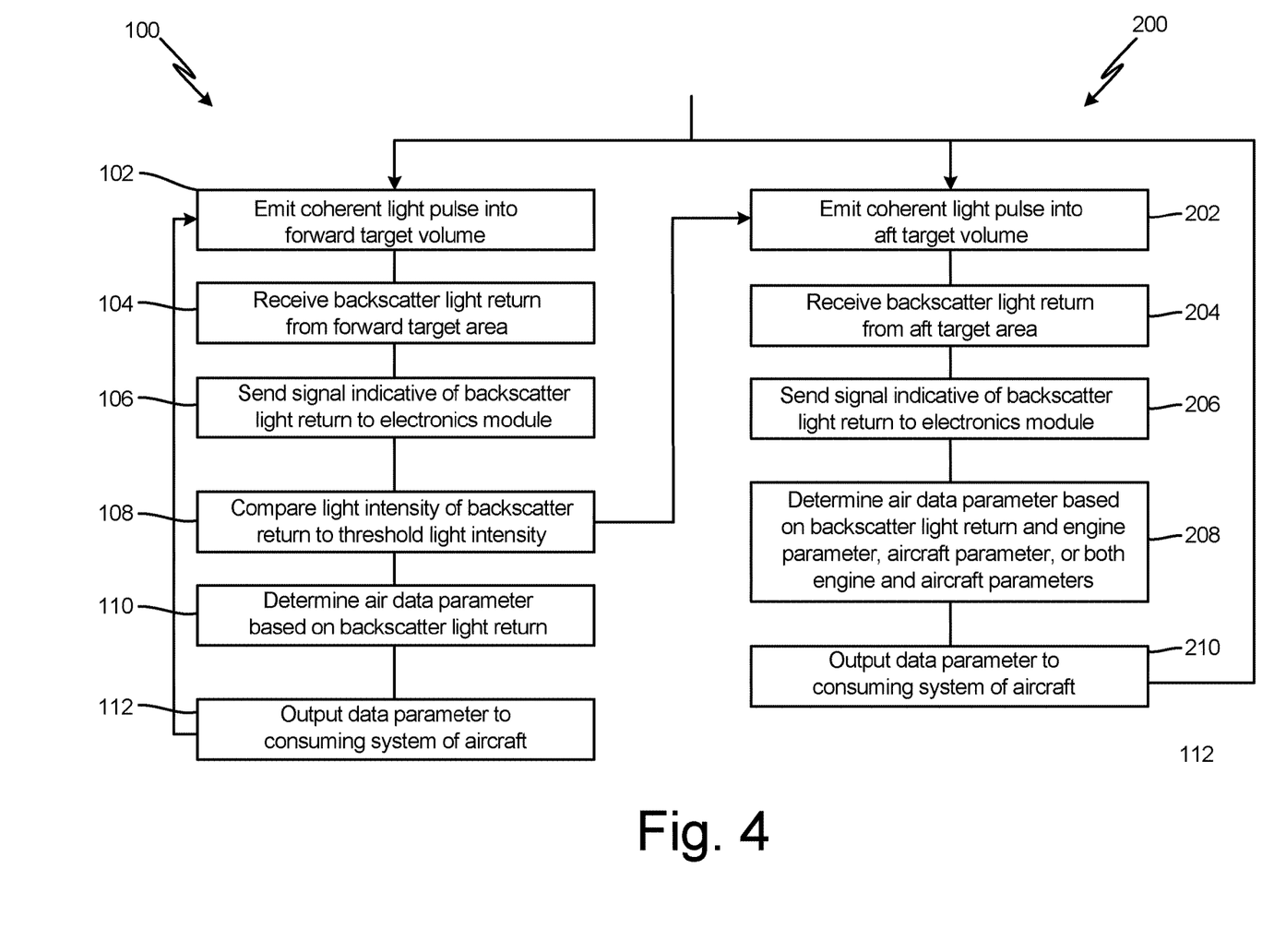
FIG. 4 is a schematic depicting steps for calculating air data derived from a laser air data probe.

Computer-readable memory 88 is encoded with instructions, that when executed by processor 86, cause the electronics module 72 to perform steps of method 100 for determining one or more air data parameters derived from coherent light pulses emitted into forward target volume 48 and method 200 for determining one or more air data parameters derived from coherent light pulses emitted into aft target volume 50. Method 100 includes steps 102, 104, 106, 108, 110, and 112, and method 200 includes steps 202, 204, 206, 208, and 210. Embodiments of electronics module 72 can be encoded with instructions that performs steps of only method 100, only method 200, or both methods 100 and 200. In each embodiment, electronics module 72 repeatedly performs steps of method 100 and/or method 200 during flight of aircraft 10 at a desired sample rate as shown in FIG. 4.

During step 102 of method 100, electronics module 72 causes laser emitter 74 to transmit a coherent light pulse into forward target volume 48. Coherent light pulses emitted into forward target volume 48 interact with aerosol particles contained within volume 48, creating backscatter light returns visible to laser air data probe 38. In step 104, laser air data probe 38 receives backscatter light returns at laser receiver 75, which transmits signal 92 to electronics module 72 in step 106. In step 108, electronics module 72 compares an intensity of backscatter light returns to a threshold light intensity stored within computer-readable memory 88. If the intensity of the backscatter light return is less than the threshold light intensity, electronic module 72 executes method 200, described below. If, however, the intensity of the backscatter light return is greater than or equal to the threshold light intensity, electronics module 72 performs step 110, during which electronics module 72 determines an air data parameter based on signal 92. For instance, an airspeed of aircraft 10 can be determined based on doppler shift, or frequency difference, between the emitted coherent light pulse and the backscatter light return. Once an air data parameter is determined, electronics module 72 outputs the air data parameter (e.g., airspeed) to a consuming system of aircraft 10 in step 112

Method 200 includes step 202 during which electronics module 72 causes laser emitter 74 to transmit a coherent light pulse into aft target volume 50. Coherent light pulses emitted into aft target volume 50 interact with aerosol particles contained within volume 50, creating backscatter light returns visible to laser air data probe 38. In step 204, laser air data probe 38 receives backscatter light returns at laser receiver 75, which transmits signal 92 to electronics module 72 in step 206. In step 208, electronics module 72 determines an air data parameter based on signal 92 and one or more engine parameter, one or more aircraft parameter, or one or more engine parameter and one or more aircraft parameter. For instance, an airspeed of aircraft 10 can be determined based on doppler shift, or frequency difference, between the emitted coherent light pulse and the backscatter light return. Subsequently, the calculated airspeed can be corrected based on one or more engine parameters (e.g., an engine power setting, a rotational speed of a fan of the engine, and a rotational speed of a compressor of the engine) and, in some embodiments, based on one or more aircraft parameters (e.g., pressure altitude, angle of attack, angle of sideslip, and position of aircraft control surfaces). Once an air data parameter is determined, electronics module 72 outputs the air data parameter to a consuming system of aircraft 10 during step 210.

In some embodiments, method 200 continues for a predetermined time period after which electronics module 72 performs method 100. During this predetermined time period, electronics module 72 repeats steps 202, 204, 206, 208, and 210 at a predetermined sample rate. In other embodiments, method 100 can be performed immediately after step 210.

Discussion of Possible Embodiments

The following are non-exclusive descriptions of possible embodiments of the present invention.

A method of determining an air data parameter for an aircraft according to an exemplary embodiment of this disclosure, among other possible things and steps includes emitting a first coherent light pulse into a first target volume aft of the aircraft within an engine exhaust flow of the aircraft and receiving a first backscatter light return from the first light pulse interacting with the first target volume. The method further includes determining a first air data parameter based on the first backscatter light return and at least one of an engine parameter indicative of an engine condition of the aircraft and an aircraft parameter indicative of a state of the aircraft and outputting the first air data parameter to a consuming system of the aircraft.

The method of the preceding paragraph can optionally include, additionally and/or alternatively, any one or more of the following features, configurations and/or additional components, and steps.

A further embodiment of the foregoing method, wherein the first coherent light pulse can be emitted along a direction parallel to a longitudinal centerline of the aircraft.

A further embodiment of any of the foregoing methods, wherein determining an air data parameter can include determining an airspeed of the aircraft based on a frequency difference between the first coherent light pulse and the first backscatter light return.

A further embodiment of any of the foregoing methods, wherein the engine parameter can be indicative of one of an engine power setting, a rotational speed of a fan of the engine, and a rotational speed of a compressor of the engine.

A further embodiment of any of the foregoing methods, wherein the aircraft parameter can be one of a position of a control surface of the aircraft, an angle of sideslip, and an angle of attack.

A further embodiment of any of the foregoing methods can further include emitting a second coherent light pulse into a second target volume forward of the aircraft.

A further embodiment of any of the foregoing methods can further include receiving a second backscatter light return from the second coherent light pulse interacting with the second target volume.

A further embodiment of any of the foregoing methods can further include determining a second air data parameter based on the second backscatter light return.

A further embodiment of any of the foregoing methods can further include outputting one of the first air data parameter and the second air data parameter to the consuming system of the aircraft based on a comparison of an intensity of the second backscatter light return to a light intensity threshold.

A further embodiment of any of the foregoing methods, wherein outputting one of the first air data parameter and the second air data parameter can include outputting the first air data parameter to the consuming system of the aircraft when the intensity of the second backscatter light return is less than the light intensity threshold.

A further embodiment of any of the foregoing methods, wherein the first air data parameter can be a first airspeed of the aircraft A further embodiment of any of the foregoing methods, wherein the second air data parameter can be a second airspeed of the aircraft.

A further embodiment of any of the foregoing methods, wherein the first air data parameter can be determined based on a frequency difference between the first coherent light pulse and the first backscatter light return, an engine parameter indicative of an engine power setting and an aircraft a parameter indicative of an angle of attack of the aircraft or an angle of sideslip of the aircraft.

A further embodiment of any of the foregoing methods, wherein emitting the first coherent light pulse can occur simultaneously with emitting the second coherent light pulse by emitting a single coherent light pulse through a laser beam splitter.

A further embodiment of any of the foregoing methods wherein emitting the first coherent light pulse occurs sequentially with emitting the second coherent light pulse by rotating a mirror to redirect coherent light from the first laser emitter into the first target volume or the second target volume.

An air data system according to an exemplary embodiment of this disclosure, among other possible things, includes a first laser emitter, a first laser receiver, and an electronics module. The electronics module includes a processor and computer-readable memory encoded with instructions that, when executed by the processor, cause the electronics module to emit, using the first laser emitter, a first coherent light pulse into a first target volume aft of the aircraft within an engine exhaust flow of the aircraft and receive, at the first laser receiver, a first backscatter light return from the first light pulse interacting with the first target volume. Additionally, the instructions cause the electronics module to determine, using the electronics module, a first air data parameter based on the first backscatter light return and at least one of an engine parameter indicative of an engine condition of the aircraft and an aircraft parameter indicative of a state of the aircraft and output the first air data parameter to a consuming system of the aircraft.

The air data system of the preceding paragraph can optionally include, additionally and/or alternatively, any one or more of the following features, configurations and/or additional components.

A further embodiment of the foregoing air data system, wherein the first coherent light pulse can be emitted along a direction parallel to a longitudinal centerline of the aircraft.

A further embodiment of any of the foregoing air data systems, wherein the first air data parameter can be determined based on a frequency difference between the first coherent light pulse and the first backscatter light return.

A further embodiment of any of the foregoing air data systems, wherein the computer-readable memory of the electronics module can be encoded with instructions that, when executed by the processor, cause the electronics module to emit, using the first laser emitter, a second coherent light pulse into a second target volume forward of the aircraft and receive, at the first laser receiver, a second backscatter light return from the second light pulse interacting with the second target volume. Additionally, the instructions cause the electronics module to determine, using the electronics module, a second air data parameter based on the second return and output the second air data parameter to the consuming system of the aircraft.

A further embodiment of any of the foregoing air data systems, wherein the computer-readable memory of the electronics module can be encoded with instructions that, when executed by the processor, cause the electronics module to compare an intensity of the second backscatter light return to a light intensity threshold and output one of the first air data parameter and the second air data parameter based on the comparison of the intensity of the second backscatter light return to the light intensity threshold.

A further embodiment of any of the foregoing air data systems can further include a mirror position to intercept coherent light pulses emitted from the first laser emitter.

A further embodiment of any of the foregoing air data systems, wherein the computer-readable memory of the electronics module can be encoded with instructions that, when executed by the processor, cause the electronics module to rotate the mirror after emitting one of the first and second coherent light pulses and before emitting the other of the first and second coherent light pulses and thereby redirect coherent light pulses emitted from the first laser emitter from the first target volume to the second target volume or from the second target volume to the first target volume.

A further embodiment of any of the foregoing air data systems can further include a laser beam splitter positioned to intercept coherent light pulses emitted from the first laser emitter.

A further embodiment of any of the foregoing air data systems, wherein emitting the first and second coherent light pulses from the first laser emitter can occur contemporaneously by dividing a coherent light pulse emitted from the first laser emitter into the first coherent light pulse and the second coherent light pulse.

A further embodiment of any of the foregoing air data systems, wherein outputting the first air data parameter and outputting the second air data parameter can include outputting the second air data parameter when an intensity of the second backscatter light return is greater than or equal to a light intensity threshold.

A further embodiment of any of the foregoing air data systems, wherein outputting the first air data parameter and outputting the second air data parameter can include outputting the first air data parameter when the intensity of the second backscatter light return is less than the light intensity threshold.

A further embodiment of any of the foregoing air data systems can further include a second laser emitter.

A further embodiment of any of the foregoing air data systems can further include a second laser receiver.

A further embodiment of any of the foregoing air data systems, wherein the computer-readable memory of the electronics module can be encoded with instructions that, when executed by the processor, cause the electronics module to emit, using the second laser emitter, a second coherent light pulse into a second target volume forward of the aircraft.

A further embodiment of any of the foregoing air data systems, wherein the computer-readable memory of the electronics module can be encoded with instructions that, when executed by the processor, cause the electronics module to receive, at the second laser receiver, a second backscatter light return from the second coherent light pulse interacting with the second target volume.

A further embodiment of any of the foregoing air data systems, wherein the computer-readable memory of the electronics module can be encoded with instructions that, when executed by the processor, cause the electronics module to determine a second air data parameter based on the second backscatter light return.

A further embodiment of any of the foregoing air data systems, wherein the computer-readable memory of the electronics module can be encoded with instructions that, when executed by the processor, cause the electronics module to output the second air data parameter to the consuming system of the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A method of determining an air data parameter for an aircraft propelled by at least one engine, the method comprising:

emitting a first coherent light pulse into a first target volume aft of the aircraft within an engine exhaust flow of the aircraft;

receiving a first backscatter light return from the first light pulse interacting with the first target volume;

determining a first air data parameter based on the first backscatter light return and at least one of an engine parameter indicative of a condition of the engine and an aircraft parameter indicative of a state of the aircraft;

emitting a second coherent light pulse into a second target volume forward of the aircraft;

receiving a second backscatter light return from the second coherent light pulse interacting with the second target volume;

determining a second air data parameter based on the second backscatter light return; and outputting one of the first air data parameter and the second air data parameter to the consuming system of the aircraft based on a comparison of an intensity of the second backscatter light return to a light intensity threshold.

2. The method of claim 1, wherein the first coherent light pulse is emitted along a direction parallel to a longitudinal centerline of the aircraft.

3. The method of claim 2, wherein determining the first air data parameter includes determining an airspeed of the aircraft based on a frequency difference between the first coherent light pulse and the first backscatter light return.

4. The method of claim 1, wherein the engine parameter is indicative of one or more of an engine power setting, fuel flow, a rotational speed of a fan of the engine, and a rotational speed of a compressor of the engine.

5. The method of claim 1, wherein the aircraft parameter is one or more of a position of a control surface of the aircraft, weight of the aircraft, an angle of sideslip, and an angle of attack.

6. The method of claim 1, wherein outputting one of the first air data parameter and the second air data parameter includes outputting the first air data parameter to the consuming system of the aircraft when the intensity of the second backscatter light return is less than the light intensity threshold, and wherein the first air data parameter is a first airspeed of the aircraft and the second air data parameter is a second airspeed of the aircraft.

7. The method of claim 1, wherein the first air data parameter is determined based on a frequency difference between the first coherent light pulse and the first backscatter light return, the engine parameter indicative of an engine power setting, and the aircraft parameter indicative of an angle of attack of the aircraft or an angle of sideslip of the aircraft.

8. The method of claim 1, wherein emitting the first coherent light pulse occurs simultaneously with emitting the second coherent light pulse by emitting a single coherent light pulse through a laser beam splitter.

9. The method of claim 1, wherein emitting the first coherent light pulse occurs sequentially with emitting the second coherent light pulse by rotating a mirror to redirect coherent light pulses from the first target volume to the second target volume or from the second target volume to the first target volume.

10. An air data system for an aircraft comprising:
a first laser emitter;
a first laser receiver; and
an electronics module comprising:
a processor; and
computer-readable memory encoded with instructions that, when executed by the processor, cause the electronics module to:
emit, using the first laser emitter, a first coherent light pulse into a first target volume aft of the aircraft within an engine exhaust flow of the aircraft;
receive, at the first laser receiver, a first backscatter light return from the first light pulse interacting with the first target volume;
determine, using the electronics module, a first air data parameter based on the first backscatter light return and at least one of an engine parameter indicative of an engine condition of the aircraft and an aircraft parameter indicative of a state of the aircraft;
output the first air data parameter to a consuming system of the aircraft;

emit, using the first laser emitter, a second coherent light pulse into a second target volume forward of the aircraft;
receive, at the first laser receiver, a second backscatter light return from the second light pulse interacting with the second target volume;
determine, using the electronics module, a second air data parameter based on the second backscatter light return; and
output the second air data parameter to the consuming system of the aircraft.

11. The air data system of claim 10, wherein the first coherent light pulse is emitted along a direction parallel to a longitudinal centerline of the aircraft.

12. The air data system of claim 11, wherein the first air data parameter is determined based on a frequency difference between the first coherent light pulse and the first backscatter light return.

13. The air data system of claim 10,
wherein the computer-readable memory of the electronics module is encoded with instructions that, when executed by the processor, cause the electronics module to:
compare an intensity of the second backscatter light return to a light intensity threshold, and
output one of the first air data parameter and the second air data parameter based on the comparison of the intensity of the second backscatter light return to the light intensity threshold.

14. The air data system of claim 10, further comprising:
a mirror positioned to intercept coherent light pulses emitted from the first laser emitter;
wherein the computer-readable memory of the electronics module is encoded with instructions that, when executed by the processor, cause the electronics module to:
rotate the mirror after emitting one of the first and second coherent light pulses and before emitting the other of the first and second coherent light pulses and thereby redirect coherent light pulses emitted from the first laser emitter from the first target volume to the second target volume or from the second target volume to the first target volume.

15. The air data system of claim 10,
a mirror positioned to intercept coherent light pulses emitted from the first laser emitter;
wherein the computer-readable memory of the electronics module is encoded with instructions that, when executed by the processor, cause the electronics module to:
rotate the mirror based on the aircraft parameter prior to emitting the first coherent light pulse, wherein the aircraft parameter is indicative of a position of a control surface of the aircraft, an angle of sideslip, and an angle of attack.

16. The air data system of claim 10, further comprising:
a laser beam splitter positioned to intercept coherent light pulses emitted from the first laser emitter;
wherein emitting the first and second coherent light pulses from the first laser emitter occur contemporaneously by dividing a coherent light pulse emitted from the first laser emitter into the first coherent light pulse and the second coherent light pulse.

17. The air data system of claim 16,
wherein outputting the first air data parameter and outputting the second air data parameter includes:

outputting the second air data parameter when an intensity of the second backscatter light return is greater than or equal to a light intensity threshold; and outputting the first air data parameter when the intensity of the second backscatter light return is less than the light intensity threshold.

18. An air data system for an aircraft comprising:

a first laser emitter;

a first laser receiver;

a second laser emitter; and a second laser receiver;

an electronics module comprising:

a processor; and computer-readable memory encoded with instructions that, when executed by the processor, cause the electronics module to:

emit, using the first laser emitter, a first coherent light pulse into a first target volume aft of the aircraft within an engine exhaust flow of the aircraft;

receive, at the first laser receiver, a first backscatter light return from the first light pulse interacting with the first target volume;

determine, using the electronics module, a first air data parameter based on the first backscatter light return and at least one of an engine parameter indicative of an engine condition of the aircraft and an aircraft parameter indicative of a state of the aircraft;

output the first air data parameter to a consuming system of the aircraft;

emit, using the second laser emitter, a second coherent light pulse into a second target volume forward of the aircraft;

receive, at the second laser receiver, a second backscatter light return from the second light pulse interacting with the second target volume;

determine a second air data parameter based on the second backscatter light return; and output the second air data parameter to the consuming system of the aircraft.

\* \* \* \* \*